United States Patent
Campagna et al.

(10) Patent No.: US 7,133,523 B2
(45) Date of Patent: Nov. 7, 2006

(54) METHOD AND SYSTEM FOR SOLVING THE WORD PROBLEM IN BRAID GROUP CRYPTOSYSTEMS

(75) Inventors: Matthew J. Campagna, Ridgefield, CT (US); John E. Massucci, Eastchester, NY (US)

(73) Assignee: Pitney Bowes Inc., Stamford, CT (US)

( * ) Notice: Subject to any disclaimer, the term of this patent is extended or adjusted under 35 U.S.C. 154(b) by 873 days.

(21) Appl. No.: 10/325,014

(22) Filed: Dec. 20, 2002

(65) Prior Publication Data

US 2004/0120515 A1    Jun. 24, 2004

(51) Int. Cl.
*H04K 1/00*    (2006.01)
*H04L 9/00*    (2006.01)

(52) U.S. Cl. .......................... 380/28; 380/277
(58) Field of Classification Search ............... 380/277, 380/28
See application file for complete search history.

(56) References Cited

U.S. PATENT DOCUMENTS

| | | | | |
|---|---|---|---|---|
| 5,241,309 A | * | 8/1993 | Cideciyan et al. | 341/59 |
| 2004/0174278 A1 | * | 9/2004 | Kadono et al. | 341/67 |
| 2004/0240672 A1 | * | 12/2004 | Girault et al. | 380/277 |

OTHER PUBLICATIONS

"Entity Authentications Schemes Using Braid Word Reduction", by Herve Sibert, Patrick Dehornoy, and Mark Girault.*

"A New Algorithm for Solving the Word Problem in Braid Groups", D. Garber, S. Kaplan, and M. Teicher-Department of Mathematics and Computer Science, Bar-Ilan University.*

"An Overview of Braid Group Cryptography", by Karl, Mahlburg.*

"Brand-generator presentation for the 4-braid Group", by Eun Sook Kang: Department of Mathematics, Korea University- Ki Hyoung Ko: Department of Mathematics, Korea Advanced Institute of Science and Technology- Sang Jin Lee, Department of Mathematics, Korea Advanced Institute of Science and Technology.*

* cited by examiner

*Primary Examiner*—Ayaz Sheikh
*Assistant Examiner*—Arezoo Sherkat
(74) *Attorney, Agent, or Firm*—Charles R. Malandra, Jr.; Angelo N. Chaclas

(57) ABSTRACT

A method for exchange of information I over a communications link, a communications system including a data processor for carrying out the method, and computer readable media for providing program code to the data processor. The system receives a signal transmitted over the link, the signal being generated in accordance with a braid group based cryptosystem; transforming the signal to obtain a word expressive of a braid in $B_n$, braid encoding the information; and transforming the word into a word in novel standard form to recover the information. Word is represented by arrays a[m], a[m] in $\{0, 1, \ldots, n-1\}$, and p[m], p[m] in $\{-1, 1\}$, and transforming the word to a standard form includes: inputting the arrays a[m], and p[m]; processing a[m] and p[m] to obtain array b[s], b[s] in $\{0, 1, \ldots, n-1\}$ and representing a positive braid word P, and variable r, $\Delta^r \cdot P$ being a word in standard form representative of the braid; and outputting b[s] and r. In one embodiment of the invention the information I is an encryption key.

28 Claims, 12 Drawing Sheets

ID SYSTEM FOR SOLVING THE
METHOD AND SYSTEM FOR SOLVING THE WORD PROBLEM IN BRAID GROUP CRYPTOSYSTEMS

BACKGROUND OF THE INVENTION

The subject invention relates to cryptosystems. More particularly it relates to a method and system for solving the word problem in braid group cryptosystems.

A group is a three-tuple (G, •, e) where G is a non-empty set; • is a binary operation such that if a and b are elements of G then a•b is an element of G; and e is an identity element such that:

For all a,b,c in G: a•(b•c)=(a•b)•c

For all a in G: a•e=a=e•a

For all a in G there exists $a^{-1}$ in G such that: $a \cdot a^{-1} = e = a^{-1} \cdot a$ A particular type of group that has been found to be useful as a basis for cryptographic systems is an n-braid group as will be described below.

FIG. 1 illustrates the elementary braid $\sigma_i$, the inverse elementary braid $\sigma_i^{-1}$ and the "product" $\sigma_i \cdot \sigma_{i+1}$. Elementary braids are most conveniently considered as operations on strands that connect pairs of upper and lower points i (i=1, 2, ..., n). As seen in FIG. 1, $\sigma_i$ is the operation of crossing strand s(i+1) (the strand connected to upper point i+1) over strand s(i) so that strand s(i+1) connects upper point i+1 to lower point i and $\sigma_i^{-1}$ crosses strand s(i) over strand s(i+1).

FIG. 1 also illustrates a binary operation (hereinafter sometimes "multiplication") represented by •. We multiply two elementary braids $\sigma_i$, $\sigma_j$ (either or both of which can be inverse elementary braids) by first performing the operation $\sigma_i$, and then the operation $\sigma_j$; as is shown for $\sigma_i \cdot \sigma_{i+1}$ in FIG. 1. It should be noted that, as shown in FIG. 1, $\sigma_i \cdot \sigma_{i+1} \neq \sigma_{i+1} \cdot \sigma_i$.

The elementary braids and inverses are used to define an n-braid group. An n-braid is defined as the braid generated on n strands by any product of m elementary braids, m>0, chosen from the set $\{\sigma_1, \sigma_2, \ldots \sigma_n, \sigma_1^{-1}, \sigma_2^{-1}, \ldots \sigma_n^{-1}\}$. It is immediately apparent from FIG. 1 that the definition of multiplication can be extended to the multiplication of two braids $\alpha$, $\beta$ by defining $\alpha \cdot \beta$ to mean performing all of the elementary operations in $\alpha$. followed by all of the elementary operations in $\beta$. (Hereinafter, for simplicity, the symbol "•" may not be explicitly written; e.g. $\alpha\beta = \alpha \cdot \beta$. The set of all n-braids is defined as $B_n$. The n-braid group is then: ($B_n$, •, e), where e is the braid that contains no crosses.

FIG. 2 shows the braid $\sigma_i \cdot \sigma_i^{-1}$. It is apparent from inspection of FIG. 2 that $\sigma_i \cdot \sigma_i^{-1} = e = \sigma_i^{-1} \cdot \sigma_i$. (Visualize "pulling the stands tight" so that they lie parallel.) From this it immediately follows that:

$$\prod_{i=0}^{m-1} \sigma_{a(i)}^{b(i)} \cdot \prod_{i=m-1}^{0} \sigma_{a(i)}^{-b(i)} = e; \quad (1)$$

where a(i) is in $\{0,1,2, \ldots n\}$ and b(i) is in $\{-1,1\}$. That is, for each braid $\alpha$ in $B_n$, $\alpha^{-1}$ can be formed by taking the product of the inverses of each elementary braid in $\alpha$ in the reverse order.

It has been shown that the n-braid group $B_n$ (i.e. the group comprising the set of braids $B_n$) is defined by braid group binary operation rules:

$$B_n = \langle \sigma_1, \ldots \sigma_n | \sigma_i \sigma_j \sigma_i = \sigma_j \sigma_i \sigma_j; \ |i-j|=1: \sigma_i \sigma_j = \sigma_j \sigma_i; \ |i-j|>1 \rangle; \quad (2)$$

as is illustrated in FIG. 3.

From (1) and (2) above the above it will be apparent to those skilled in the art each braid in $B_n$ can be expressed by a plurality of words of the form:

$$\prod_{i=0}^{m-1} \sigma_{a(i)}^{b(i)};$$

indeed, since m can increase without limit, by an infinity of words. (As used herein the term "word" refers to expressions of the form:

$$\prod_{i=0}^{m-1} \sigma_{a(i)}^{b(i)};$$

while the terms "n-braid" and "braid" refer to the structure created on n strands by the operations specified by a word. Words are termed equal if they express the same braid.)

It is clear from observation that every braid induces a permutation $\Pi = (a_1, \ldots a_n)$ on 1,2, n such that the ith upper point is connected to the $a_i$th lower point by strand s (i). It can be shown that every permutation $\Pi$ can be written as a particular positive braid having no two strings cross each other more than once, which is commonly referred to as a permutation braid. (By "positive braid" herein is meant a braid wherein the left going strand always crosses over the right going strand; i.e. a braid which can be expressed as a word which does not include any inverse elementary braids: $\sigma_i^{-1}$. When reference is made herein to a word expressing a "permutation braid" such word should be understood to be in a standard form known to those skilled in the art.)

An important permutation braid in $B_n$ is the "fundamental braid" which induces the permutation (n, n−1, ... 1) and can be expressed as a word in the standard form:

$(\sigma_{n-1} \ldots \sigma_1)(\sigma_{n-1} \ldots \sigma_2) \ldots (\sigma_{n-1} \ldots \sigma_{n-2})\sigma_{n-1} \equiv \Delta$.

It has been shown that every braid in $B_n$ can be expressed as:

$$\prod_{j=1}^{r} \Delta_j^{b(j)} \cdot P \equiv \Delta^k \cdot P;$$

where b(j) is selected from $\{1,-1\}$, and P is a positive braid. It is also known that a positive braid P can be expressed as a product of permutation braids, $A_0 \ldots A_{p-1}$.

As is generally the case for modern cryptosystems, braid group cryptosystems are based on a hard problem. (Those skilled in the art will recognize that a hard problem is a problem for which the time required to find a solution increases with some parameter so rapidly that it is not feasible to find a solution for large enough values of the parameter without use of some secret information, or "key". For braid group cryptosystems the parameter is typically m, the word length or number of elementary braids in a word. Such problems are said to require "greater than polynomial time" or "greater than NP time".)

A hard problem in braid groups is the conjugacy search problem, which can be stated as: given x and $b=axa^{-1}$, a, b, and x all elements of $B_n$, find a. (Of course, if x is expressed as a particular word, w(x), b can not simply be expressed as the concatenation $w(a)\_w(x)\_w(a^{-1})$ but must be transformed in some manner so that w(a) (and thus a) cannot be identified by simple pattern matching of w(x).)

FIG. 4 shows the known Diffie-Hillman Key Exchange Mechanism, which uses the conjugacy search problem to allow parties to exchange cryptographic keys over a non-secure communications link.

At step 10 parties A and B partition the n-braid set $B_n$ into subsets $LB_n$ and $RB_n$ such that: for all a in $LB_n$ and all b in $RB_n$, a•b=b•a. Preferably this accomplished by choosing $LB_n$ to be the subset of braids involving only twists of the leftmost strands 0,1, . . l, and $RB_n$ to be the subset of braids involving only twists of the rightmost strands n−r, . . . n; where l+r=n. The result follows immediately from (2).

At step 12 the parties agree upon braid x in $B_n$. Braid x is chosen to be reasonably complex so as to protect against brute force attacks. Those skilled in the art will recognize how to select x to provide a desired level of security. Note that steps 10 and 12 can be carried out over a non-secure link such as a broadcast channel or even by publication.

At step 14A party A generates and maintains in secrecy a braid a in $LB_n$. At step 16A party A computes and sends to party B a braid $\alpha=axa^{-1}$. At step 20A party A receives a braid $\beta=bxb^{-1}$ from party B; b in $RB_n$ and similarly maintained in secrecy. At step 22A party A computes a braid K=a$\beta a^{-1}=abxa^{-1}b^{-1}$.

Party B carries out complementary steps 14B through 22B for b in $RB_n$ to obtain K=b$\alpha$b$^{-1}$=baxa$^{-1}$b$^{-1}$.

Because of the way in which $LB_n$ and $RB_n$ are selected A and B can be sure that the values each obtains for braid K are equal, i.e. represent the same braid structure; and, because to do so would require solving the hard conjugacy search problem, an adversary cannot determine (in a reasonable time, or at a reasonable cost) a or b from knowledge of x and $\alpha$ and $\beta$; and thus cannot determine K.

In general A and B obtain words expressing K, w (K), w' (K), which are not the same. Accordingly, at steps 24A and 24B A and B each derives an identical key, which is typically a key for a symmetric key encryption system, from the expressions w (K) and w' (K), respectively; as will described further below.

A basic problem, upon which the success of braid group cryptosystems in general depends is the word problem, which can be stated as: given two distinct words w (y), expressing a braid y in $B_n$, and w($\delta$), expressing a braid $\delta$ in $B_n$, is y=$\delta$? Equivalently, does an algorithm, C, exist which will transform any word w(y) into a standard form, C(w(y)), such that: C(w(y)) is the same as C(w'($\delta$)) if and only if y=$\delta$? Accordingly at steps 24A and 24B parties A and B compute C(w(K)) and C(w'(K)) to obtain identical expressions for K and recover the information content of braid K. (By "recover" herein is meant to express in a convenient standard form.) Then any convenient, agreed upon function can be used to generate a secret, common key.

While the word problem is not considered hard in the cryptographic sense and methods for solving it do exist, it is believed that a need for simpler, faster methods continues While the word problem has been described with respect to a particular key exchange mechanism, those skilled in the art will recognize that the word problem and systems and methods for its solution have general applicability to braid group cryptographic systems.

Other methods for performing operations on a different representation of braid groups (the "band-generator" representation) have been presented at the AsiaCrypt 2001. Conference by Cha et al. While these methods may provide analogous results in the band-generator braid group representation they are structurally and logically distinct from, and neither teach nor suggest, the methods of the present invention as described and claimed herein.

Thus it is an object of the subject invention to provide a system and method for solving the word problem in braid group cryptosystems.

BRIEF SUMMARY OF THE INVENTION

The above object is achieved and the disadvantages of the prior art are overcome in accordance with the subject invention by a method for secure exchange of information I over a communications link, a communications system including a data processor for carrying out the method, and computer readable media for providing program code to the data processor, for: receiving a signal E[I] transmitted over the link, the signal E[I] being generated in accordance with a braid group based cryptosystem; transforming the signal E[I] to obtain a word w(K) expressive of a braid K in $B_n$, braid K encoding the information I; and transforming the word w(K) into a word in Max Run form to recover the information I.

In accordance with one aspect of the subject invention the word w(K) is represented by arrays a[m], a[m] in {0, 1, . . . , n−1}, and p[m], p[m] in {−1, 1}, and transforming the word w(K) to Max Run form includes: inputting the arrays a[m], and p[m]; processing a[m] and p[m] to obtain array b[s], b[s] in {0, 1, . . . , n−1} and representing a positive braid word P, and variable r, $\Delta^r$•P being a word in Max Run form representative of braid K; and outputting b[s] and r.

In accordance with another aspect of the subject invention processing of arrays a[m] and p[m] is carried out in accordance with an inversion matrix c[n−1][max], max being equal to (n)(n/2) and, for i from 0 to n−2, $\sigma_i^{-1}$ being equal to $$\Delta^{-1} \cdot \prod_{j=0}^{max-1} \sigma_{c[i][j]}$$

In accordance with another aspect of the subject invention processing of arrays a[m] and p[m] includes: processing the arrays a[m] and p[m] to obtain intermediate array b[q], b[q] in {0, 1, . . . , n−1}, and variable r; processing the array b[q] to obtain the array b[s] and variable h, $$\Delta^h \cdot \prod_{i=0}^{s-1} \sigma_{b[i]} = P;$$

and setting r=r+h.

In accordance with still another aspect of the subject invention processing the array b[q] includes: determining values for variables k and i, k<i; if predetermined conditions are met, processing an array b[s] to attempt to shift element b[i] in array b[s] left to location k in array b[s] in accordance with braid group binary operation rules, to obtain array b[m] and variable j; and setting b[s]=b[m].

In accordance with another aspect of the subject invention the array b[s] is processed recursively.

In accordance with still another aspect of the subject invention the information I is an encryption key.

Other objects and advantages of the subject invention will be apparent to those skilled in the art from consideration of the detailed description set forth below and the attached drawings.

DETAILED DESCRIPTION OF PREFERRED EMBODIMENTS OF THE INVENTION

Figure 1:
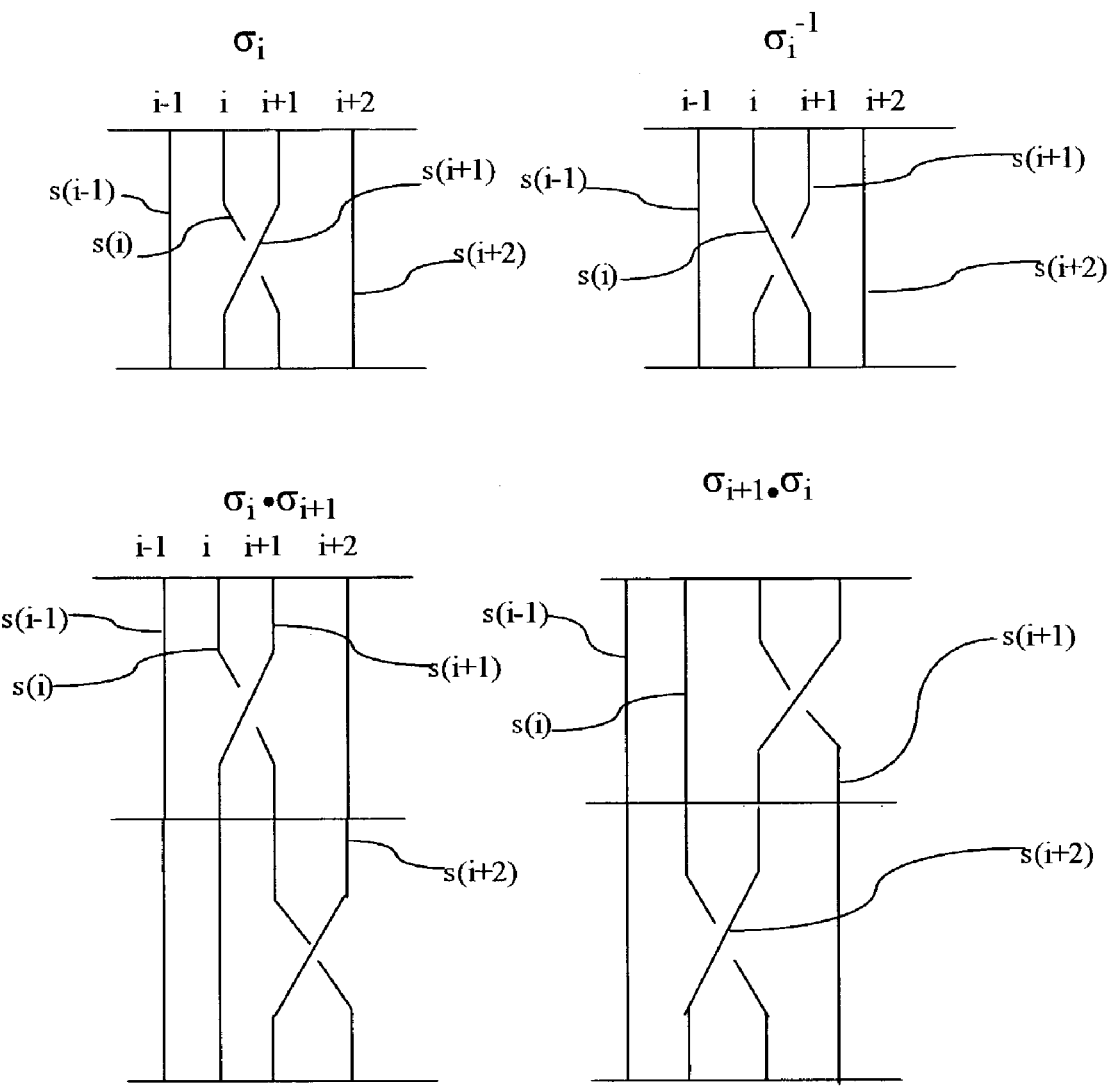
FIG. 1 illustrates elementary braids and products of adjacent elementary braids in an n-braid group.
Figure 2:
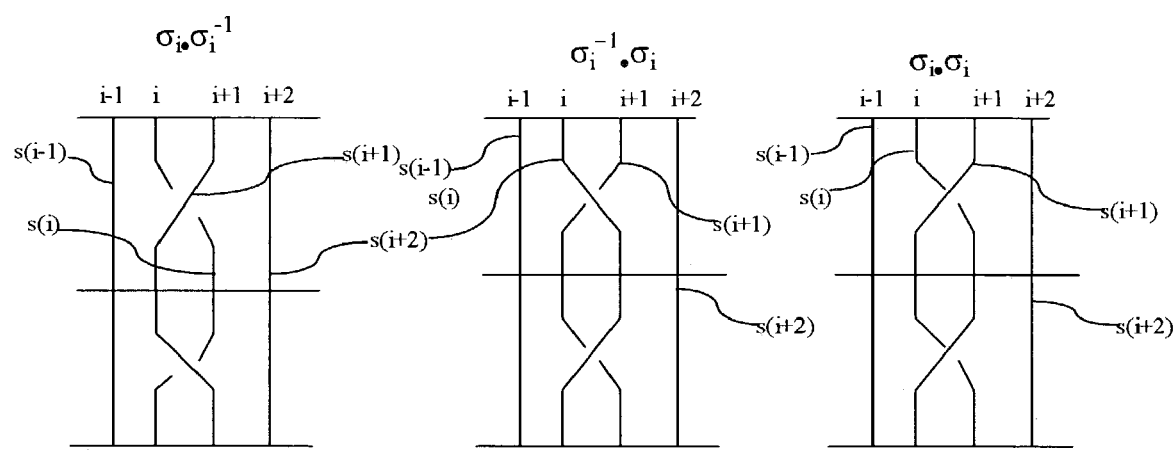
FIG. 2 illustrates products of elementary braids with their inverses to generate the identity braid and the product of an elementary braid with itself.
Figure 3:
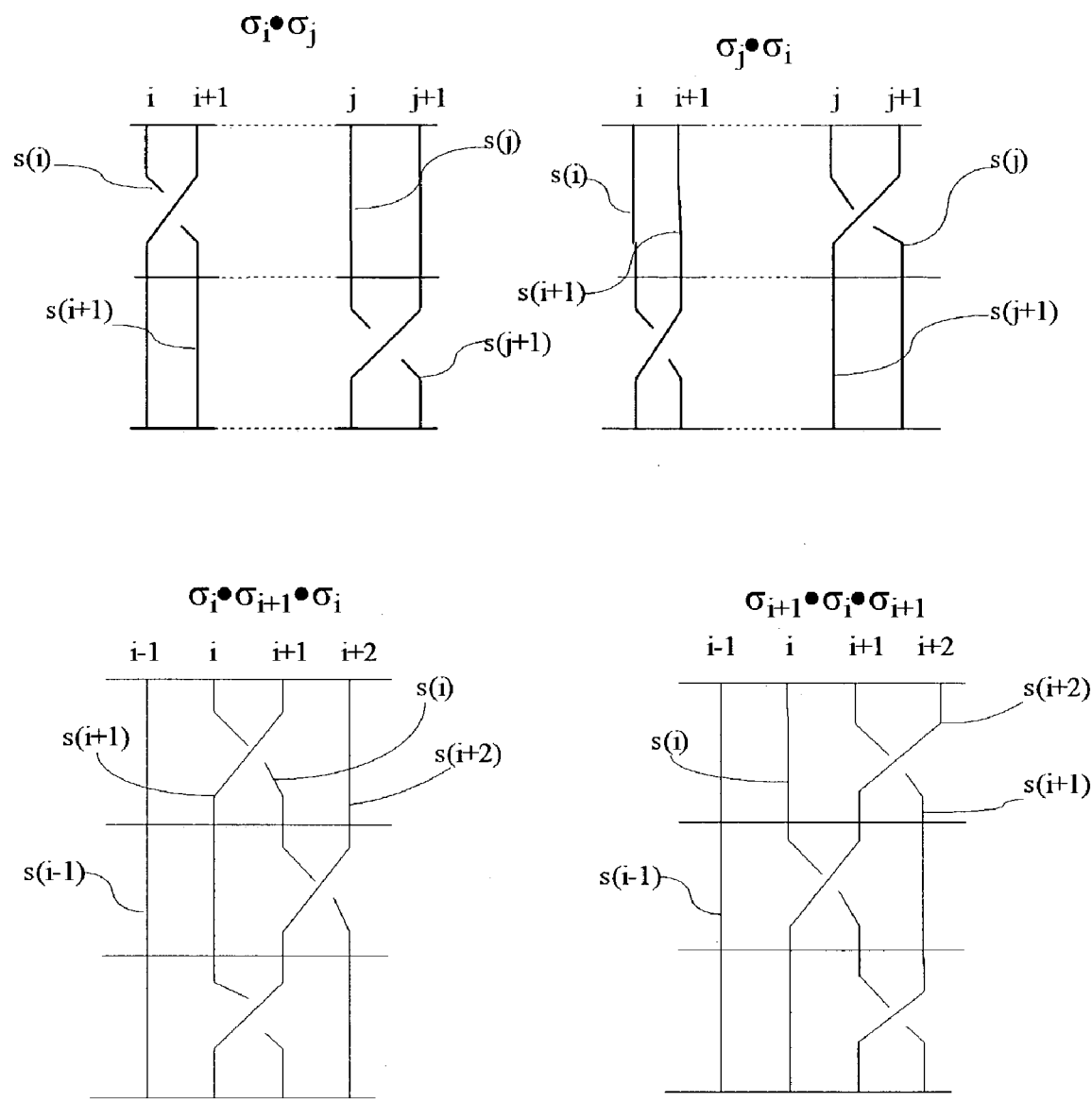
FIG. 3 illustrates transformation rules that define an n-braid group.
Figure 4:
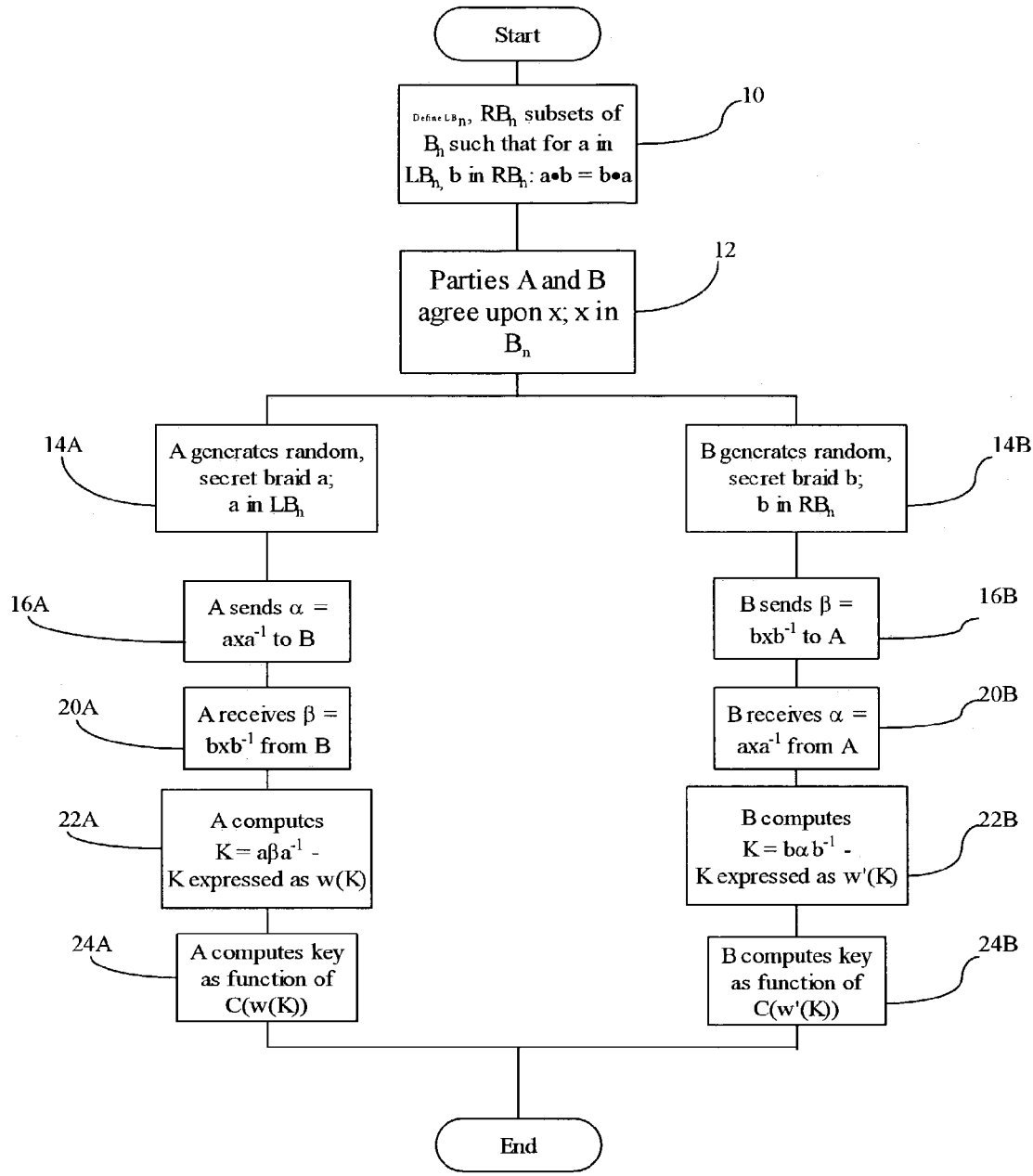
FIG. 4 shows a flow diagram for a known method of key exchange management.
Figure 5:
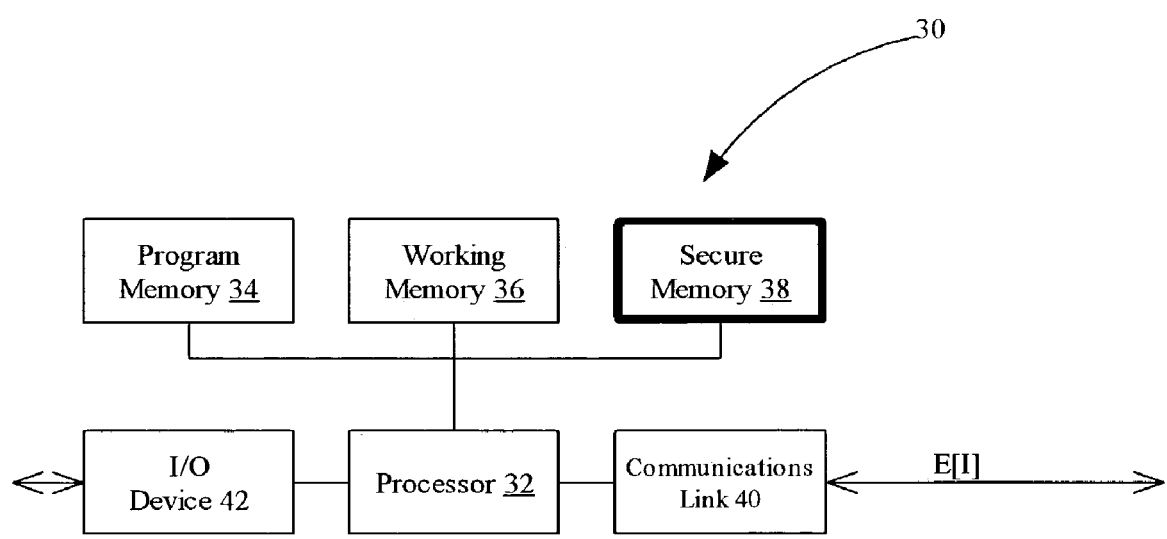
FIG. 5 shows a communications station in accordance with the present invention for communicating in a braid group cryptosystem.

FIG. 5 shows data processing system programmed to function as communications station 30 in a braid group cryptosystem. Station includes a processor 32 which communicates with program memory 34, which stores program code for controlling the operation of station 30 in accordance with the present invention, working memory 36 for storing intermediate results, and secure memory 38 which stores "keys" (i.e. secret information used to encrypt and decrypt information) in a secure manner. (those skilled in the art will recognize the importance of maintaining security of keys and design of systems to maintain such security is well within their ability.) Processor 32 controls communications link 40 to send and receive signal E[I] containing encrypted information, typically over a non-secure channel; and also controls I/O device 42 to communicate with an operator or other systems.

Program memory 34 can comprise any convenient form of computer readable medium and program code can be transmitted to memory 34 by other convenient form of computer readable transmission medium. The term "computer-readable medium" as used herein refers to any medium that participates in providing program code to processor 32 for execution. Such a medium may take many forms, including but not limited to, non-volatile media, volatile media, and transmission media. Non-volatile media includes, for example, optical or magnetic disks, or random access read only memory. Volatile media includes random access dynamic memory. Transmission media includes coaxial cables, copper wire and fiber optics.

Transmission media can also take the form of acoustic or light waves, such as those generated during radio wave and infrared data communications.

By program code herein is meant sequences of indicia recorded on, or signals transmitted by, computer readable media, which, when input by a processor cause the processor to carry out a corresponding sequence of operations, i.e. execute the program code.

Figure 6:
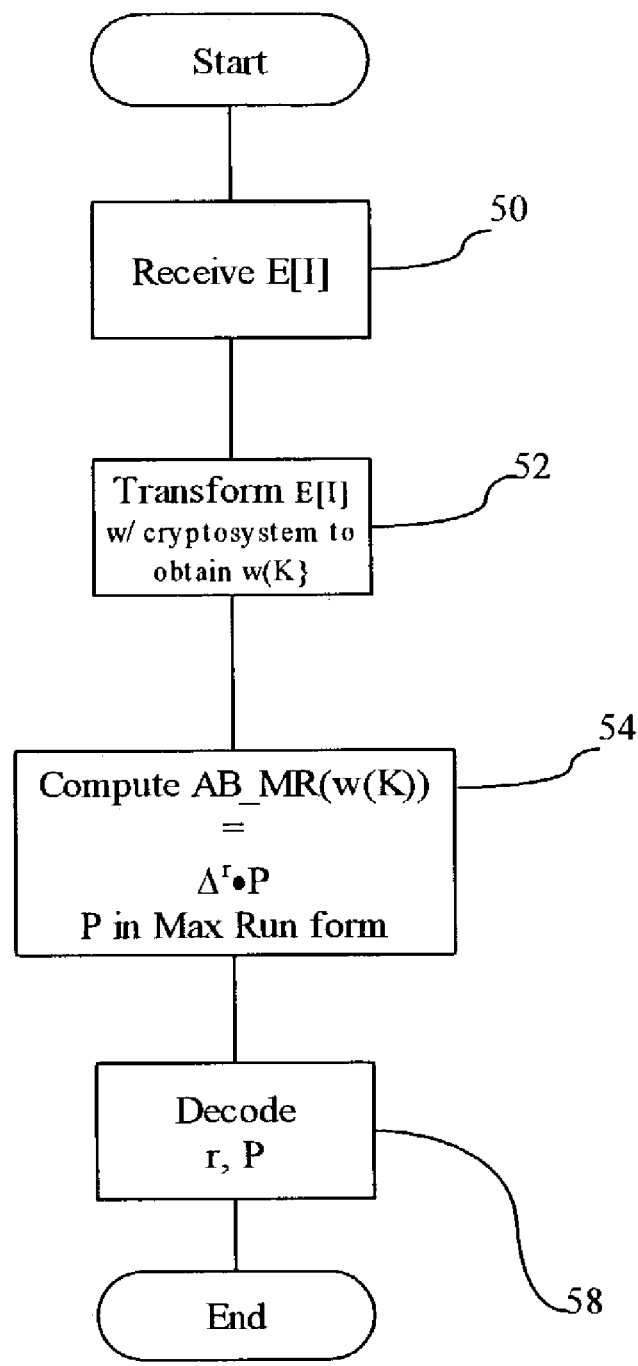
FIG. 6 shows a flow diagram of the operation of the communications station of FIG. 5.

FIG. 6 shows a flow diagram of the operation of station 30. At step 50 station 30 receives signal E[I] which is encrypted in accordance with a braid group encryption system; and at step 52 transforms E[I] to obtain w(K), a word expressing braid K, which encodes information of interest. However since braid group cryptosystems will not in general generate the same word for the same braid each time a signal is encrypted and decrypted, the information of interest is, in effect, scrambled and w(K) must be placed in an agreed standard form to recover the information.

For example, in the Diffie-Hellman key exchange mechanism described above, E[I] expresses $\beta = b \times b^{-1}$ if station 30 is operated by party A, and $\alpha = axa^{-1}$ if station 30 is operated by party B; and A and B in general obtain distinct words w(K) and w'(K) expressing braid K when $b\alpha b^{-1}$ and $a\beta a^{-1}$ are computed and the parties then derive identical keys by placing w(K) and w'(K) in standard form. In other braid based cryptosystems, such as the proposed Birman-Ko-Lee system, braid K may encode a key to be used to secure messages in another encryption technique. Thus solution of the word problem is in general necessary for the application of braid group based cryptosystems.

Thus solution of the word problem is in general necessary for the application of braid group based cryptosystems.

Thus at step 54, in accordance with the present invention, processor 32 is controlled in accordance with a novel software program (hereinafter sometimes the AB_MR program) is used to transform a word Q into a novel standard form AB_MR(Q).

(The AB_MR program is known to produce a standard form, i.e. AB_MR(w(y)) is the same as AB_MR(w'($\delta$)) if and only if y=$\delta$, herein sometimes referred to as the Max Run form. A word is said to be n the Max Run form if it is expressed as:

$$\Delta^n \alpha_0 \alpha_1 \ldots \alpha_{k-1}, n \text{ in } \{ \ldots, -1, 0, 1, \ldots \}$$

and $\alpha_0$ is the longest possible braid, after moving all powers of the fundamental braid $\Delta$, which can be formed by series of sequences of increasing generators from $\sigma_0 \sigma_1 \ldots \sigma_{n-2}$, then $\sigma_0 \sigma_1 \ldots \sigma_{n-3}$, then $\sigma_0 \sigma_1 \ldots \sigma_{n-4}$, etc.; skipping any value in the run which cannot be obtained in the re-sequencing.)

Figure 7:
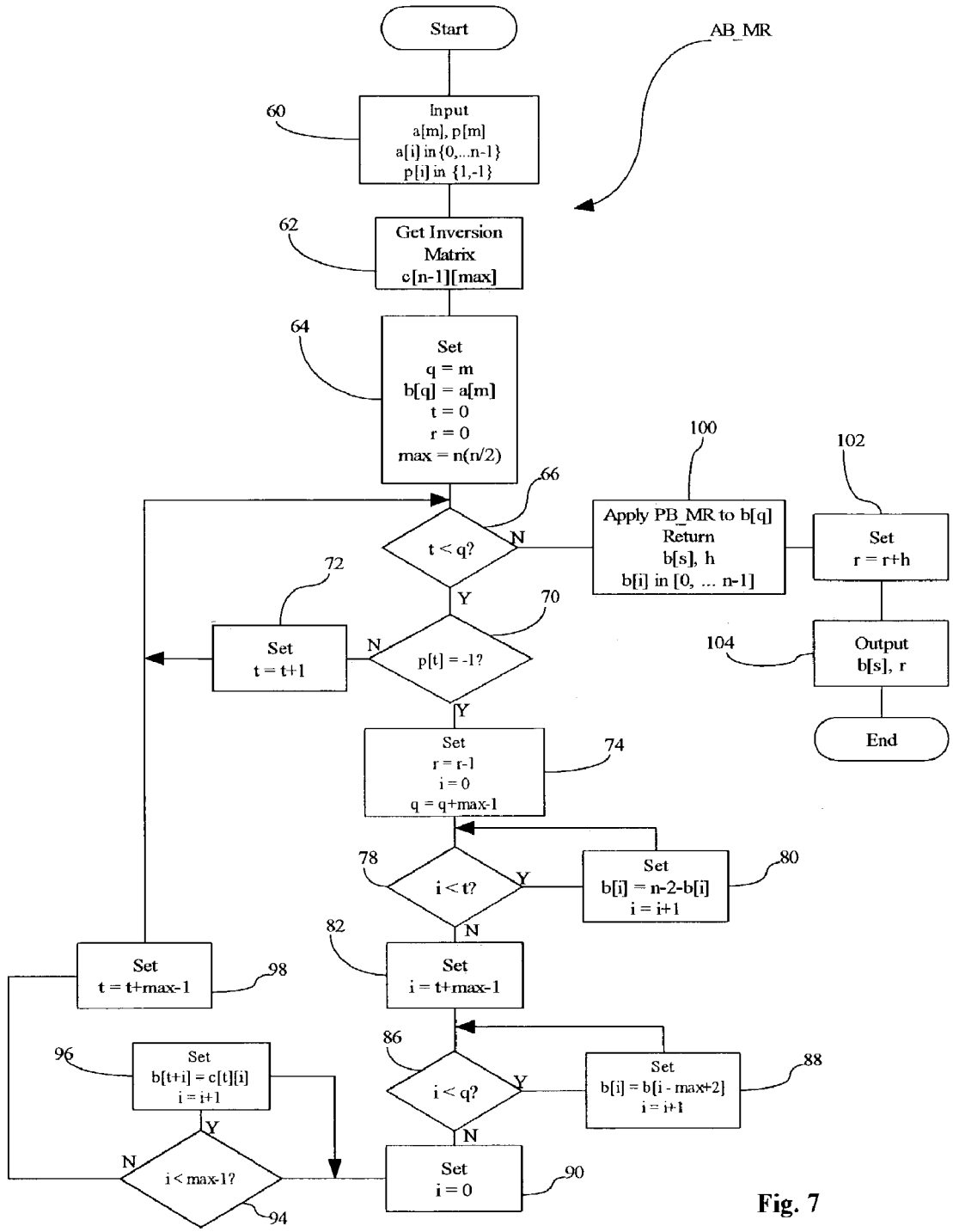
FIG. 7 shows a flow diagram of a program in accordance with the subject invention for transforming an arbitrary braid into a standard form.

The AB_MR program has as an input an arbitrary word Q in the form:

$$\prod_{i=0}^{m-1} \sigma_{a(i)}^{p(i)},$$

a(i) in {0,1 ... n−1}, p(i) in {−−1,1};

and generates an equal output word in the form:

$\Delta^r \cdot P$, where P is a positive braid in Max Run Form; as shown in FIG. 7.

Then, at step 58 r and P are decoded to recover the information encoded in K.

Turning to FIG. 7, at step 60 station 30 receives arrays a[m], p[m] such that $$Q = \prod_{i=0}^{m-1} \sigma_{a(i)}^{p(i)}.$$

At step 62 processor 32 gets inversion matrix c[n−1][max], max=n(n/2) such that:

$$\sigma_i^{-1} = \Delta^{-1} \sigma_{c[i][0]} \cdots \sigma_{c[i][max-1]};$$

which can be computed by processor 32 as will be described further below, or pre-determined and stored either locally or remotely.

At step 64 processor 32 sets variable q=m, array b[q]=a[m], variable t=0, variable r=0, and variable max=n(n/2).

At step 66 processor 32 determines if t is less than q, and, if so, at step 70 determines if p[t] equals −1. If not, at step 72 processor 32 sets t=t+1 and returns to step 66; and, otherwise, at step 74 sets r=r−1, i=0, q=q+max −1. At step 78 processor 32 determines if i is less than t, and, if so, at step 80 sets the ith element in b[m], b[i], equal to n−2−b[i], and sets i=i+1, and returns to step 78.

If i is not less than t at step 78, processor 32 goes to step 82 and sets i=t+max−1. Then at step 86 processor 32 determines if i is less than q. If so, at step 88 processor 32 sets b[i]=b[i−max+2] and i=i+1 and returns to step 86.

If i is not less than q at step 86, processor 32 goes to step 90 and sets i=0. Then at step 94 processor 32 determines if i is less than max−1. If so, at step 96 processor 32 sets b[t+i] equal to element c[t][i] of array c[n−1][max] and i=i+1, and returns to step 94.

If i is not less than max−1 at step 94, processor 32 goes to step 98 and sets t=t+max−1, and returns to step 66.

If t is not less than q at step 66, than array b[q] and variable r are such that:

$$Q = \Delta^r \sigma_{b[0]}, \ldots, \sigma_{b[q-1]}, \ r \text{ in } \{\ldots, -1, 0\};$$

where $\sigma_{b[0]}, \ldots, \sigma_{b[q-1]}$ is a positive braid, but is not necessarily in Max Run form. Thus, at step 100, processor 32 applies program PB_MR(b[q]), described further below; returning array b[s] and variable h; and at step 102 sets r=r+h so that:

$$P = \prod_{i=0}^{s-1} \sigma_{b[i]},$$

P in Max Run form; and

Q=Δ$^r$•P, whereby Q is in Max Run form.

Then at step 104 processor 32 outputs array b[s] and r, which represent the information content of Q in a convenient standard form, and ends. Thus, for example, if Q=w(K) in the Diffie-Hellman key exchange mechanism described above, than a user may generate an encryption key as any convenient, agreed function of r and b[s] with confidence that other users will obtain the same key from K, and that no outside party will be able to obtain the key.

(Those skilled in the art will recognize that programs that are essentially logically the same as the AB_MR program described above can be formed by rearranging, combining or dividing the steps described. Accordingly the term AB_MR program, or other specific name for programs described herein, means the named program as described herein or such logically similar programs.)

Figure 8A:
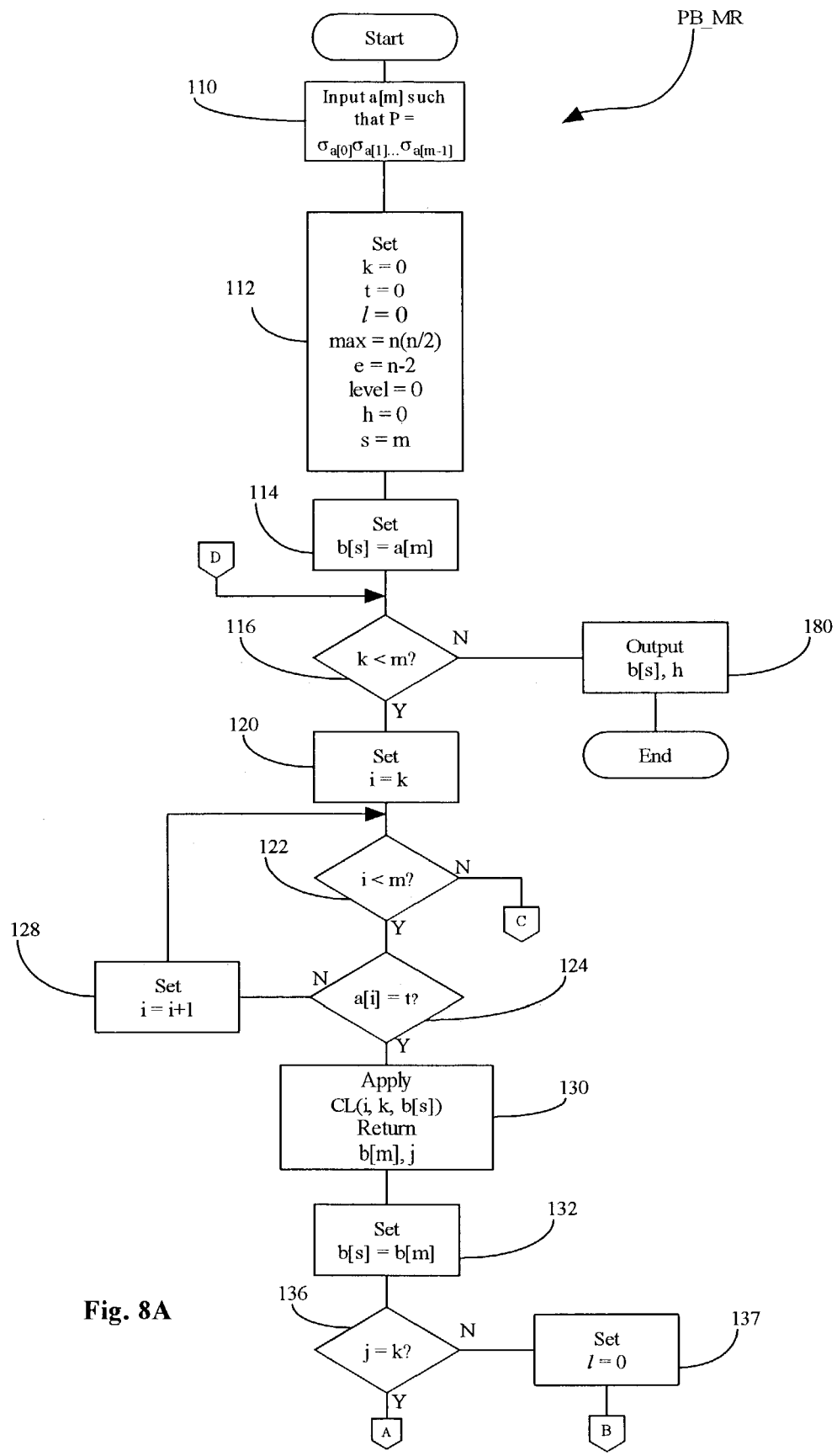
FIGS. 8A and 8B show a flow diagram of a program in accordance with the subject invention for transforming a positive braid into a standard form.
Figure 8B:
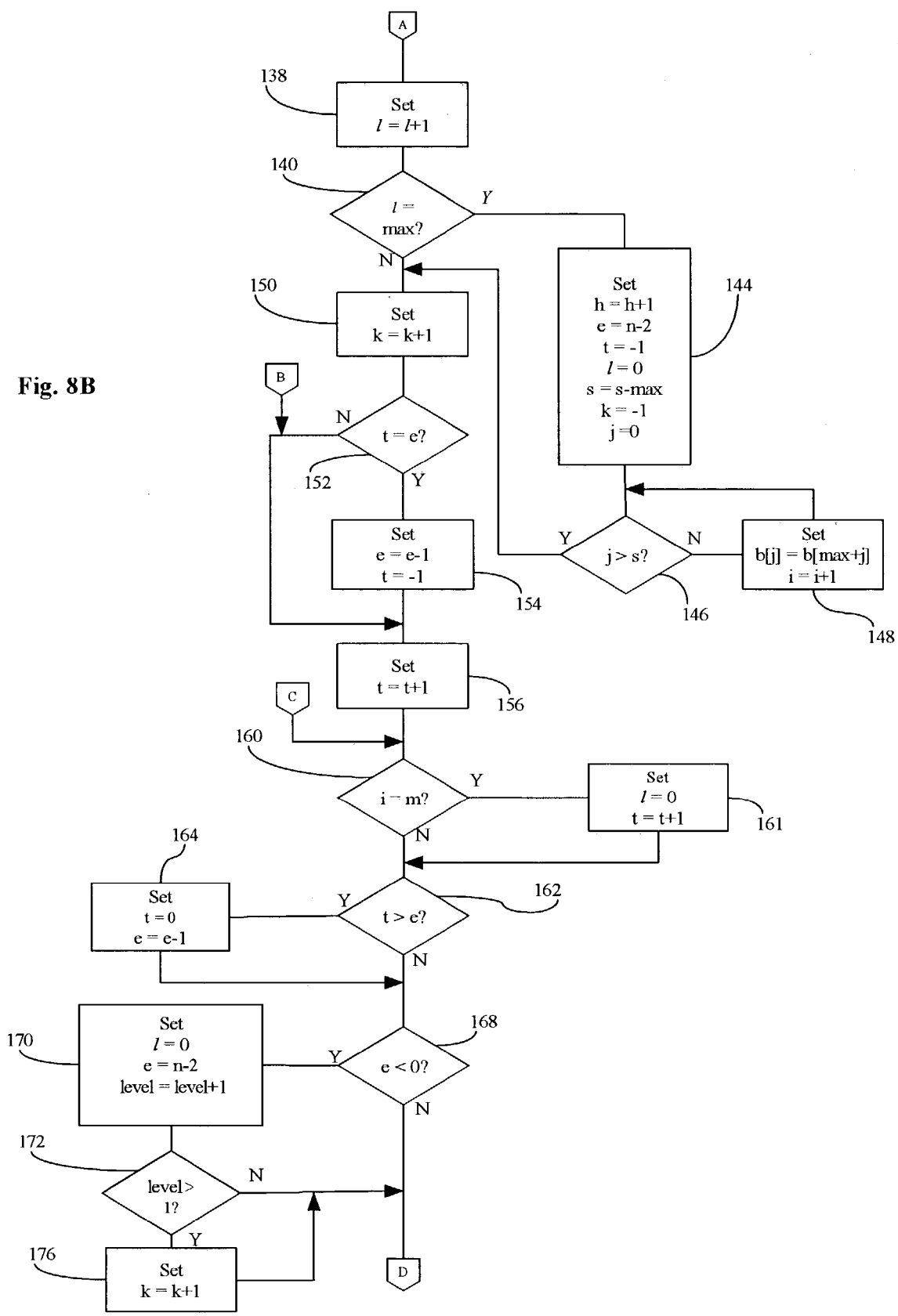

Turning to FIGS. 8A and 8B, processor 32 is controlled in accordance with the present invention by a novel program (hereinafter sometimes the PB_MR program) for transforming an input array, a[m], expressing a positive braid P, into Max Run form.

At step 110 processor 32 inputs a[m]. In the embodiment of the present invention described here, a[m] is taken to be b[q] from step 100 in FIG. 7. At step 112 sets variable k=0, variable t=0, variable/=0, variable max=n(n/2), variable e=n−2, variable level=0, variable h=0, and variable s=m; and at step 114 processor 32 sets array b[s]=a[m]. (In order to simplify naming variables and arrays, in different programs described in the present application different arrays and variables can have the same name. However, those skilled in the art will recognize that consistency is maintained within programs and in transferring arguments between programs.)

Then at step 116, processor 32 determines if k is less than m. If so, at step 120 it sets i=k, and at step 122 determines if i is less than m. If so, at step 124 processor 32 determines if a[i]=t. If a[i] does not equal t, then at 128 processor 32 sets i=i+1 and returns to step 122. If at step 122 i is not less than m, processor 32 goes to step 160 (shown in FIG. 8B).

If a[i]=t, then at step 130 processor 32 attempts to shift the ith element in b[s] left to the kth location; applying commute left program CL(i, k, b[s]), described further below, and returning array b[m] and variable j. Then at 132 processor 32 sets b[s]=b[m], and at step 136 determines if returned variable j is equal to k.

If at step 136, j is equal to k, then at step 138 (shown in FIG. 8B) I is set equal to I+1 and at 140, processor 32 determines if I is equal to max. If I=max, then at step 144 processor 32 sets h=h+1, e=n−2, t=−1, I=0, s=s−max, k=−1, and j=0. At 146 processor 32 determines if j is greater than s, and if not, goes to step 148 and sets b[j]=b[j+max] and j=j+1, and returns to step 146.

If at step 146, j is greater than s, or if at step 140 I is not equal to max, processor 32 goes to step 150 and sets k=k+1.

Then at step 152 processor 32 determines if t is equal to e, and if so at 154 sets e=e−1 and t=−1, and goes to 156 and sets t=t+1. If t is not equal to e processor 32 goes directly to 156. Processor 32 then goes to step 160 and determines if i is equal to m. If so, at step 161 it sets I=0 and t=t+1, then goes to step 162 and determines if t is greater than e. If i is not equal to m, processor 32 goes directly to 162.

At step 162, if t is greater than e then at step 164 processor 32 sets t=0 and e=e−1, then goes to step 168 and determines if e is less than 0. If t is not greater than e processor 32 goes directly to step 168.

At step 168, if e is less than 0 then at step 170 processor 32 sets I=0, e=n−2, and level=level+1 then goes to step 172 and determines if level is greater than 1. If level is not greater than 1, or if at step 168 e is not less than 0, processor 32 goes directly to step 116 (shown in FIG. 8A). Otherwise, at step 176 processor 32 set k=k+1 and goes to step 116.

Returning to step 136, if j is not equal to k, at step 137 processor 32 sets I=0 and goes to step 156 (shown in FIG. 8B).

Returning to step 116, if k is not less than m processor 32 outputs array b[s] and variable h at step 180, where:

$$\prod_{i=0}^{q-1} \sigma_{b[i]} = \Delta^h \cdot P = \Delta^h \cdot \prod_{i=0}^{s-1} \sigma_{b[i]},$$

P in Max Run form;

and ends.

In the embodiment of the present invention described here, b[q] is input from, and b[s] and h are returned to, step 100 in FIG. 7.

Figure 9:
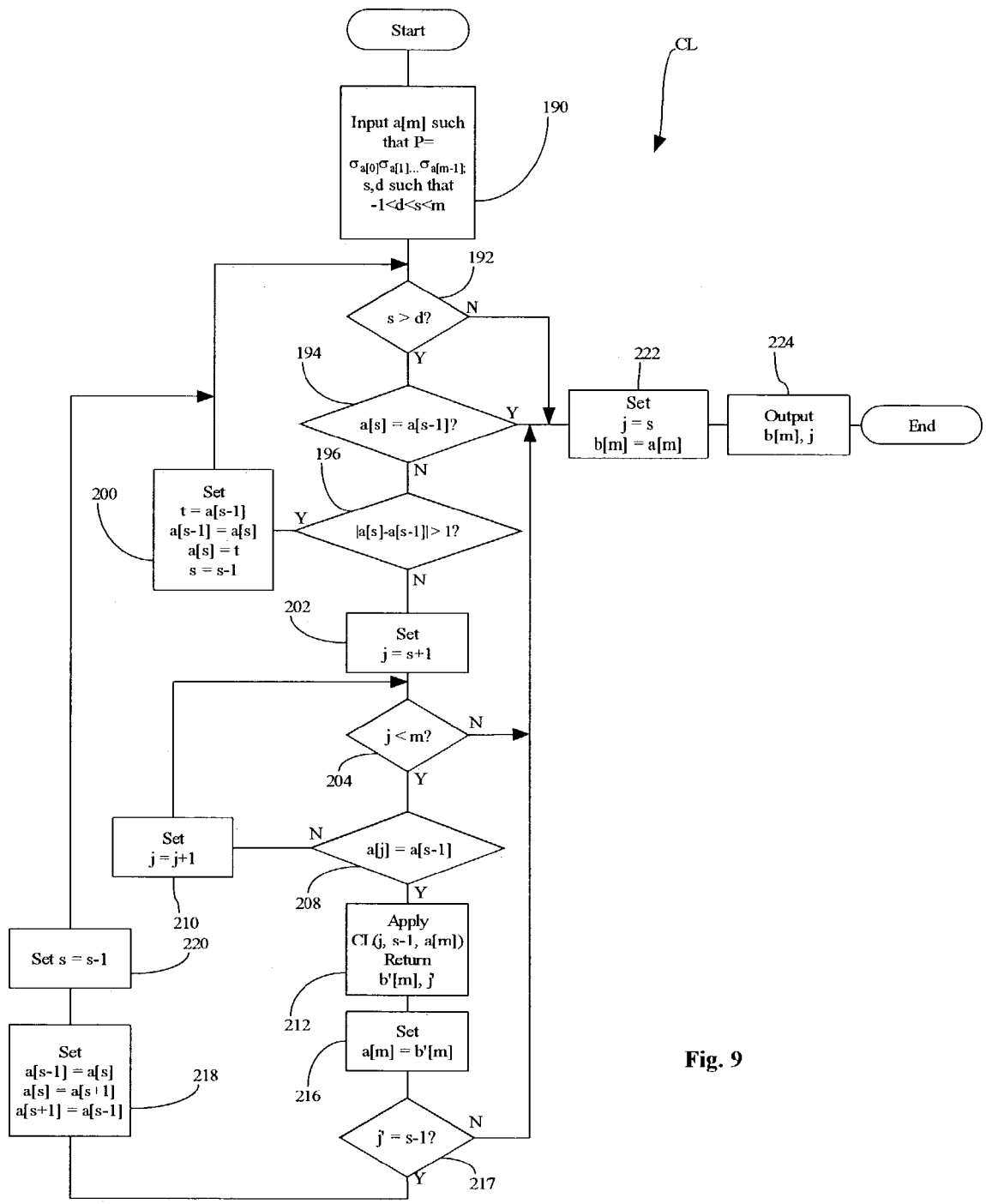
FIG. 9 shows a flow diagram of a program in accordance with the subject invention for commuting an element of a braid to the left.

Turning to FIG. 9, processor 32 is controlled in accordance with the present invention by a novel program (hereinafter sometimes the CL program) for transforming an input array, a[m], expressing a positive braid P, by attempting to shift the element at location s, $\sigma_{a[s]}$, left to location d in accordance with (2) above.

At step 190 processor 32 inputs array a[m] and variables s and d. In the embodiment of the present invention described here, a[m] is taken to be b[s], s is taken to be i, and d to be k; all from step 130 in FIG. 8A.

At step 192 processor 32 determines if s is greater than d; and if so, at step 194 determines if a[s] is equal to a[s−1]. If a[s] is not equal to a[s−1], then at step 196 processor 32 determines if the absolute value of a[s]−a[s−1] is greater than 1. If the absolute value is greater than 1 then at step 200 processor 32 sets t=a[s−1], a[s−1]=a[s], a[s]=t, s=s−1, and returns to step 190.

Otherwise if the absolute value is equal to 1, at step 202 processor 32 sets j=s+1; and at step 204 determines if j is less than m. If so, then at step 208 it determines if a[j] is equal to a[s−1]; and if not, at step 210 sets j=j+1 and returns to step 204. Otherwise, at step 212 processor 32 recursively applies CL to a[m] with s'=j and d'=s+1; returning b"[m] and j', and setting a[m]=b"[m] at step 216.

At step 217 processor 32 determines if j' is equal to s−1. If so, at step 218 processor 32 sets a[s−1]=a[s], a[s]=a[s+1], and a[s+1]=a[s−1]; and at step 220 sets s=s−1, and returns to step 192.

At step 192 if s is not greater than d, then processor 32 goes to step 222 and sets j=s and b[m]=a[m], and outputs b'[m] and j at step 224 and ends. In this case the element at s will have been successfully shifted and:

$$\prod_{i=0}^{m-1} \sigma_{b[i]}$$

will equal $$\prod_{i=0}^{m-1} \sigma_{a[i]}$$

(a[m] as input), with j=d and $\sigma_{b[j]}=\sigma_{a[s]}$.

If at step 194 a[s] is equal to a[s+1], or at step 204 j is not less than m, or at step 217 j' is not equal to s−1, process 32 goes to step 222. In these cases the element at s will not have been successfully shifted and j will not equal d. This is expected since many braids have "twists" which prevent a particular commutation in accordance with (2).

Figure 10:
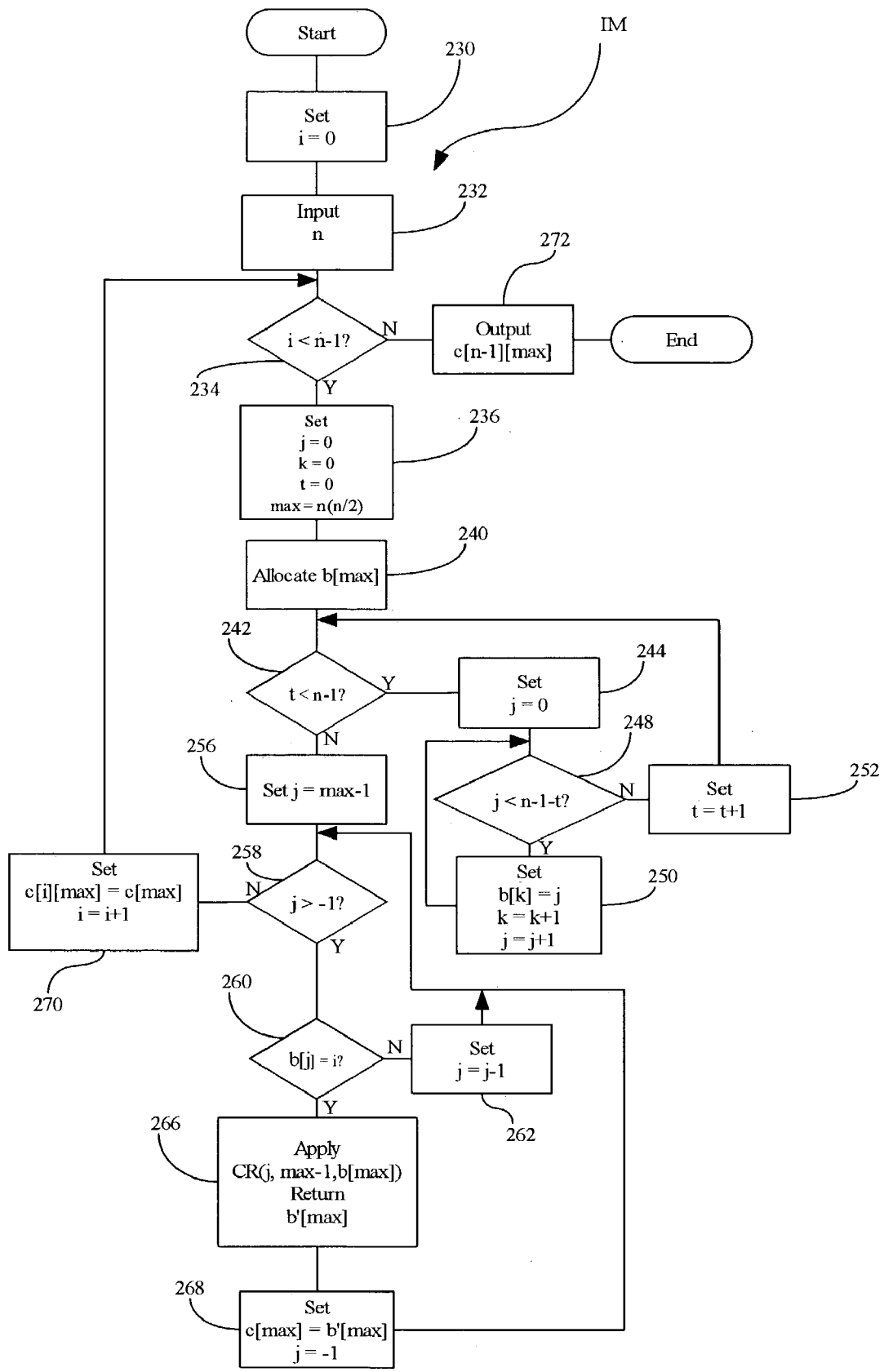
FIG. 10 shows a flow diagram of a program in accordance with the subject invention for computing an inversion matrix.

Turning to FIG. 10, processor 32 is controlled in accordance with the present invention by a novel program (hereinafter sometimes the EI program) for generating a an inversion matrix, c[n−1][max], for elementary braids in braid group $B_n$ such that:

$$\sigma_i^{-1} = \Delta^{-1} \cdot \prod_{j=0}^{max-1} \sigma_{c[i][j]},$$

i in {0, . . . , n−1}.

As noted above matrix c[n−1][max] can either be generated in when program AB_MR is called or can be generated off-line and stored in memory 34 or other convenient storage.

At step 230 processor 32 sets i equal to 0, and at step 232 inputs n. Then, at step 234 it determines if i is less that n−1. If so, at step 236 it sets variable max=n(n/2), variable j=0, variable k=0, and variable t=0, and at step 240 allocates array b[max]. Then at step 242, processor 32 determines if t is less than n−1.

If so, at step 244, processor 32 sets j=0, and at step 248 determines if j is less than n−1−t. If so, at step 250 processor 32 sets b[k]=j, k=k+1, and j=j+1 and returns to step 248. Otherwise at step 252 it sets t=t+1 and returns to step 242.

If, at step 242, t is not less than n−1, then at step 256 processor 32 sets j=max−1 and, at step 258, determines if j is greater than −1. If so, at step 260 it determines if b[j] is equal to i; and, if not, at step 262 sets j=j−1 and returns to step 258.

Otherwise, If b[ ]=i, then at step 266 processor 32 attempts to shift the jth element in b[max] right to the(max−1)th location; applying commute Right program CR(j, max−1, b[max]), described further below, and returning array b'[max]. At step 268 processor 32 sets c[max]=b'[max] and j=−1 and returns to step 258.

If at step 258, j is not greater than −1, then at step 270 processor 32 sets c[i][max] (the ith row in c[n−1][max]0=c[max] and returns to step 234; and if at step 234, t is not less than n−1, goes to step 272, outputs c[n−1][max] and ends.

Figure 11:
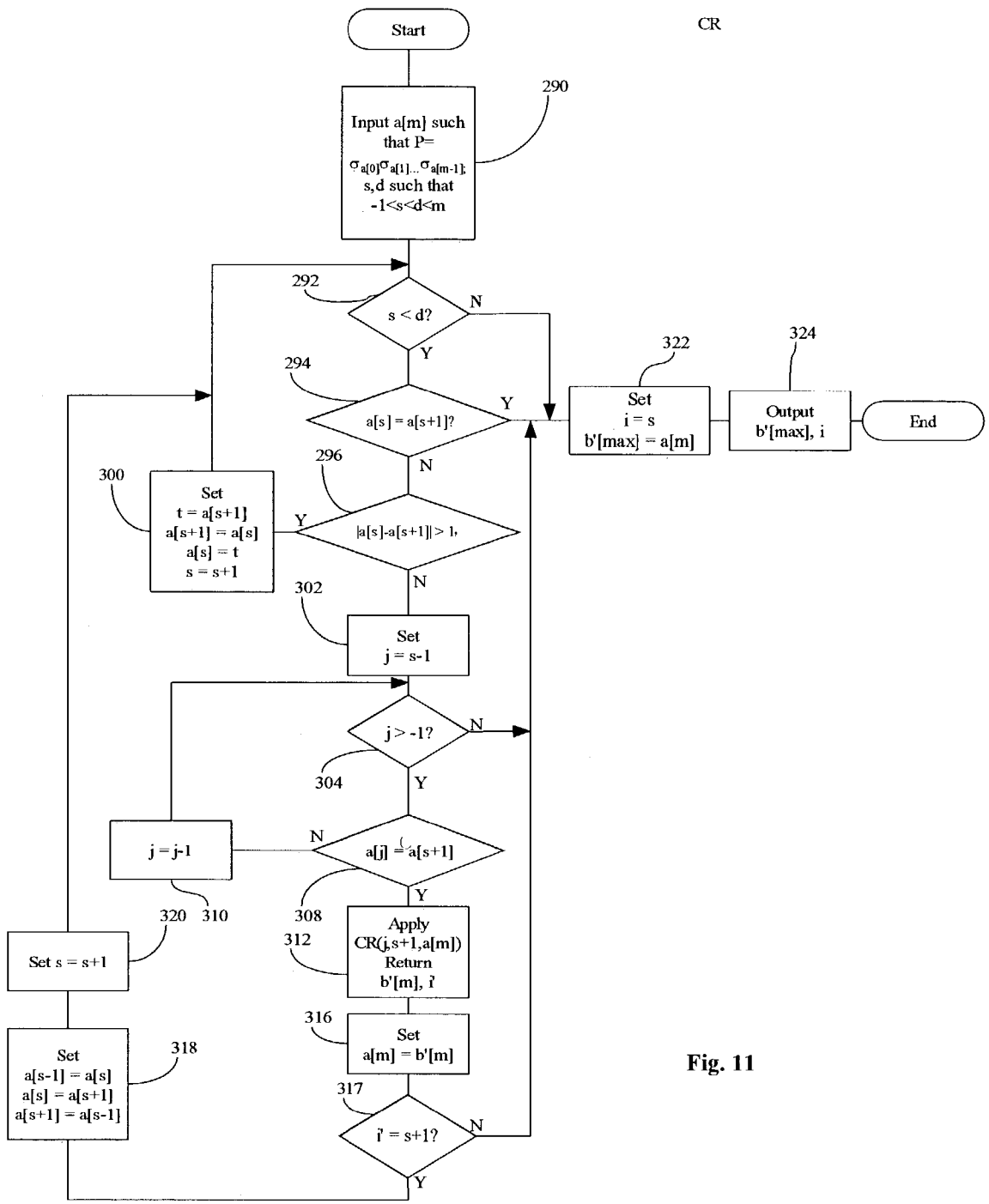
FIG. 11 shows a flow diagram of a program in accordance with the subject invention for commuting an element of a braid to the right.

Turning to FIG. 11, processor 32 is controlled in accordance with the present invention by a novel program (hereinafter sometimes the CR program) for transforming an input array, a[m], expressing a positive braid P, by shifting the element at location s, $\sigma_{a[s]}$, right to location d in accordance with (2) above.

At step 290 processor 32 inputs array a[m] and variables s and d. In the embodiment of the present invention described here, a[m] is taken to be b[max], s is taken to be j and d to be max−1; all from step 266 in FIG. 10.

At step 292 processor 32 determines if s is less than d; and if so, at step 194 determines if a[s] is equal to a[s+1]. If a[s] is not equal to a[s+1], then at step 296 processor 32 determines if the absolute value of a[s]−a[s+1] is greater than 1. If the absolute value is greater than 1 then at step 300 processor 32 sets t=a[s+1], a[s+1]=a[s], a[s]=t, s=s+1, and returns to step 290.

Otherwise if the absolute value is equal to 1, at step 302 processor 32 sets j=s−1; and at step 304 determines if j is greater than −1. If so, then at step 308 it determines if a[j] is equal to a[s+1]; and if not, at step 310 sets j=j−1 and returns to step 304. Otherwise, at step 312 processor 32 recursively applies CR to a[m] with s=j and d=s+1; returning b'[m] and i', and setting a[m]=b'[m] at step 316.

At step 317 processor 32 determines if i' is equal to s+1. If so, at step 218 processor 32 sets a[s−1]=a[s], a[s]=a[s+1], and a[s+1]=a[s−1]; and at step 220 sets s=s−1, and returns to step 292.

At step 292 if s is not less than d, then processor 32 goes to step 322 and sets j=s and b'[max]=a[m], and outputs b'[max] and i at step 224 and ends. In this case the element at s will have been successfully shifted and:

$$\prod_{j=0}^{max-1} \sigma_{b'[i]}$$

will equal $$\prod_{i=0}^{m-1} \sigma_{a[i]} \ (a[m] \text{ as input}),$$

with j=d and $\sigma_{b'[j]}=\sigma_{a[s]}$.

If at step 294 a[s] is equal to a[s+1], or at step 304 j is not less than m, or at step 317 i' is not equal to s+1, process 32 goes to step 222. In these cases the element at s will not have been successfully shifted and j will not equal d. As with the CL program this is expected The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for secure exchange of information I over a communications link, said method comprising the steps of:
   a) receiving a signal E[I] transmitted over said link, said signal E[I] being generated in accordance with a braid group based cryptosystem;
   b) transforming said signal E[I] to obtain a word w(K) expressive of a braid K in $B_n$, braid K encoding said information I; and
   c) transforming said word w(K) into a word in Max Run form to recover said information I.

2. A method as described in claim 1 where said word w(K) is represented by arrays a[m], a[m] in {0, 1, . . . , n−1}, and p[m], p[m] in {−1, 1}, and said step of transforming said word w(K) to Max Run form comprises the steps of:
   a) inputting said arrays a[m], and p[m];
   b) processing a[m] and p[m] to obtain array b[s], b[s] in {0, 1, . . . , n−1} and representing a positive braid word P, and variable r, $\Delta^r \cdot P$ being a word in Max Run form representative of braid K; and
   c) outputting b[s] and r.

3. A method as described in claim 2 where said processing step b is carried out in accordance with an inversion matrix c[n−1][max], max being equal to (n)(n/2) and, for i from 0 to n−2, $\sigma_i^{-1}$ being equal to $$\Delta^{-1} \cdot \prod_{j=0}^{max-1} \sigma_{c[i][j]}.$$

4. A method as described in claim 2 where said processing step b comprises the steps of:

b1) processing said arrays a[m] and p[m] to obtain intermediate array b[q], b[q] in {0, 1, . . . , n−1} and variable r;

b2) processing said array b[q] to obtain said array b[s] and variable h, $$\Delta^h \cdot \prod_{i=0}^{s-1} \sigma_{b[i]} = P;$$

and b3) setting r=r+h.

5. A method as described in claim 4 where said processing step b2 comprises the steps of:
   b2.1) determining values for variables k and i, k<i;
   b2.2) if predetermined conditions are met, processing array b[s] to attempt to shift element b[i] in array b[s] left to location k in array b[s] in accordance with braid group binary operation rules, to obtain array b[m] and variable j; and
   b2.3) setting b[s]=b[m].

6. A method as described in claim 5 where said array b[s] is processed recursively.

7. A method as described in claim 2 where said information I is an encryption key.

8. A method as described in claim 1 where said information I is an encryption key.

9. A method for secure exchange of information I over a communications link, said method comprising the steps of:
   a) receiving a signal E[I] transmitted over said link, said signal E[I] being generated in accordance with a braid group based cryptosystem;
   b) transforming said signal E[I] to obtain a word w(K) expressive of a braid K in $B_n$, braid K encoding said information I; and
   c) a step for transforming said word w(K) into a word in Max Run form to recover said information I.

10. A method as described in claim 9 where said information I is an encryption key.

11. A communications station, said communications station including a programmable data processor, said processor being programmed to control said station to:
    a) receive a signal E[I] transmitted over said link, said signal E[I] being generated in accordance with a braid group based cryptosystem;
    b) transform said signal E[I] to obtain a word w(K) expressive of a braid K in $B_n$, braid K encoding said information I; and
    c) transform said word w(K) into a word in Max Run form to recover said information I.

12. A communications station as described in claim 11 where said word w(K) is represented by arrays a[m], a[m] in {0, 1, . . . , n−1}, and p[m], p[m] in {−1, 1}, and said processor is programmed to transform said word w(K) to Max Run form by controlling said station to:
    a) input said arrays a[m], and p[m];
    b) process arrays a[m] and p[m] to obtain array b[s], b[s] in {0, 1, . . . , n−1} and representing a positive braid word P, and variable r, $\Delta^r \cdot P$ being a word in Max Run form representative of braid K; and
    c) output b[s] and r.

13. A communications station as described in claim 12 where processing of said arrays a[m] and p[m] is carried out in accordance with an inversion matrix c[n−1][max], max being equal to (n)(n/2) and, for i from 0 to n−2, $\sigma_i^{-1}$ being equal to $$\Delta^{-1} \cdot \prod_{j=0}^{max-1} \sigma_{c[i][j]}.$$

14. A communications station as described in claim 12 where said processor is programmed to obtain said array b[s] and said variable h by controlling said station to:
   b1) process said arrays a[m] and p[m] to obtain intermediate array b[q], b[q] in {0, 1, . . . , n−1} and variable r;
   b2) process said array b[q] to obtain said array b[s] and variable h, $$\Delta^h \cdot \prod_{i=0}^{s-1} \sigma_{b[i]} = P;$$

and
   b3) set r=r+h.

15. A communications station as described in claim 14 where said processor is further programmed to obtain said array b[s] and said variable h by controlling said station to:
   b2.1) determine values for variables k and i, k<i;
   b2.2) if predetermined conditions are met, process array b[s] to attempt to shift element b[i] in array b[s] left to location k in array b[s] in accordance with braid group binary operation rules, to obtain array b[m] and variable j; and
   b2.3) set b[s]=b[m].

16. A communications station as described in claim 15 where said array b[s] is processed recursively.

17. A communications station as described in claim 12 where said information I is an encryption key.

18. A communications station as described in claim 11 where said information I is an encryption key.

19. A method for secure exchange of information I over a communications link, said method comprising the steps of:
   a) receiving a signal E[I] transmitted over said link, said signal E[I] being generated in accordance with a braid group based cryptosystem;
   b) transforming said signal E[I] to obtain a word w(K) expressive of a braid K in $B_n$, braid K encoding said information I; and
   c) applying an AB_MR program to said word K to transform said word w(K) into a word in Max Run form to recover said information I.

20. A method as described in claim 19 where said information I is an encryption key.

21. A computer readable medium for providing program code for execution by a programmable data processor, said processor being responsive to said program code to control a communications station to:
   a) receive a signal E[I] transmitted over said link, said signal E[I] being generated in accordance with a braid group based cryptosystem;
   b) transform said signal E[I] to obtain a word w(K) expressive of a braid K in $B_n$, braid K encoding said information I; and
   c) transform said word w(K) into a word in Max Run form to recover said information I.

22. A computer readable medium as described in claim 21 where said word w(K) is represented by arrays a[m], a[m] in {0, 1, . . . , n−1}, and p[m], p[m] in {−1, 1}, and said processor is responsive to said program code to transform said word w(K) to Max Run form by controlling said station to:
   a) input said arrays a[m], and p[m];
   b) process arrays a[m] and p[m] to obtain array b[s], b[s] in {0, 1, . . . , n−1} and representing a positive braid word P, and variable r, $\Delta^r \cdot P$ being a word in Max Run form representative of braid K; and
   c) output b[s] and r.

23. A computer readable medium as described in claim 22 where processing of said arrays a[m] and p[m] is carried out in accordance with an inversion matrix c[n−1][max], max being equal to (n)(n/2) and, for i from 0 to n−2, $\sigma_i^{-1}$ being equal to $$\Delta^{-1} \cdot \prod_{j=0}^{max-1} \sigma_{c[i][j]}.$$

24. A computer readable medium as described in claim 22 where said processor is responsive to said program code to obtain said array b[s] and said variable h by controlling said station to:
   b1) process said arrays a[m] and p[m] to obtain intermediate array b[q], b[q] in {0, 1, . . . , n−1} and variable r;
   b2) process said array b[q] to obtain said array b[s] and variable h, $$\Delta^h \cdot \prod_{i=0}^{s-1} \sigma_{b[i]} = P;$$

and
   b3) set r=r+h.

25. A computer readable medium as described in claim 24 where said processor is further responsive to said program code to obtain said array b[s] and said variable h by controlling said station to:
   b2.1) determine values for variables k and i, k<i;
   b2.2) if predetermined conditions are met, process array b[s] to attempt to shift element b[i] in array b[s] left to location k in array b[s] in accordance with braid group binary operation rules, to obtain array b[m] and variable j; and
   b2.3) set b[s]=b[m].

26. A computer readable medium as described in claim 25 where said array b[s] is processed recursively.

27. A computer readable medium as described in claim 22 where said information I is an encryption key.

28. A computer readable medium as described in claim 21 where said information I is an encryption key.

* * * * *